(12) United States Patent
Lu et al.

(10) Patent No.: US 12,248,824 B2
(45) Date of Patent: *Mar. 11, 2025

(54) PREDICTION AND AUTOMATIC PERFORMANCE OF COMPUTER-RELATED ACTIVITIES

(71) Applicant: Orby AI, Inc., Mountain View, CA (US)

(72) Inventors: Dongxu Lu, Cupertino, CA (US); Na Liu, Bellevue, WA (US)

(73) Assignee: Orby AI, Inc., Mountain View, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/327,794

(22) Filed: Jun. 1, 2023

(65) Prior Publication Data

US 2024/0168827 A1    May 23, 2024

Related U.S. Application Data

(63) Continuation of application No. 17/992,689, filed on Nov. 22, 2022, now Pat. No. 11,704,174.

(51) Int. Cl.
  *G06F 9/54*    (2006.01)
  *G06N 7/01*    (2023.01)

(52) U.S. Cl.
  CPC .............. *G06F 9/542* (2013.01); *G06N 7/01* (2023.01)

(58) Field of Classification Search
  CPC ................... G06F 9/542; G06N 7/01
  See application file for complete search history.

(56) References Cited

U.S. PATENT DOCUMENTS

| | | | |
|---|---|---|---|
| 2004/0186835 A1* | 9/2004 | Sakurai | G06N 5/025 |
| 2005/0172027 A1* | 8/2005 | Castellanos | H04L 41/5009 |
| | | | 707/999.1 |
| 2009/0089092 A1* | 4/2009 | Johnson | G06Q 10/06 |
| | | | 705/2 |
| 2009/0119126 A1* | 5/2009 | Johnson | G06Q 10/063116 |
| | | | 705/2 |
| 2009/0172671 A1 | 7/2009 | Bobak et al. | |
| 2011/0295999 A1* | 12/2011 | Ferris | H04L 47/83 |
| | | | 709/224 |
| 2013/0080641 A1 | 3/2013 | Lui et al. | |

(Continued)

*Primary Examiner* — Tuan C Dao
(74) *Attorney, Agent, or Firm* — Duane Morris LLP

(57) ABSTRACT

A method comprises constructing, for a specific activity, a decision model based on action data of one or more actions, each action having an identifier of an activity performed with a computer application, use data being operated on by the computer application, and a timestamp, the decision model including a rule specifying a first activity as a next activity or a probabilistic classifier that accepts use data being operated on via the specific activity and outputs an identifier of an activity to be performed as a next activity with a probability. The method comprises detecting performance of the specific activity, when the decision model for the specific activity includes the rule, automatically applying the rule, and when the decision model for the specific activity includes the probabilistic classifier and no applicable rule: executing the probabilistic classifier to obtain a list of candidate next activities and an associated list of probabilities.

20 Claims, 7 Drawing Sheets

(56) References Cited

U.S. PATENT DOCUMENTS

| | | | |
|---|---|---|---|
| 2015/0025931 A1* | 1/2015 | Li | G06Q 10/0633 |
| | | | 705/7.27 |
| 2015/0026027 A1 | 1/2015 | Priess et al. | |
| 2015/0295855 A1* | 10/2015 | Karthikeyan | H04L 65/1106 |
| | | | 370/232 |
| 2016/0063192 A1* | 3/2016 | Johnson | G16H 40/20 |
| | | | 705/2 |
| 2016/0217384 A1 | 7/2016 | Leonard et al. | |
| 2017/0061315 A1 | 3/2017 | Leonard et al. | |
| 2019/0012210 A1* | 1/2019 | Chen | G06F 9/5011 |
| 2019/0102676 A1* | 4/2019 | Nazari | G06N 3/08 |
| 2019/0113973 A1* | 4/2019 | Coleman | G06F 3/011 |
| 2019/0394083 A1* | 12/2019 | Sglavo | G06F 11/1448 |
| 2020/0177980 A1 | 6/2020 | Shin et al. | |
| 2020/0349647 A1* | 11/2020 | Crabtree | G06F 16/951 |

* cited by examiner

FIG. 3A

Raw Event for Sending Email 310
{
"id": "e0daa604-369b-4c0b-8a25-b1897723a5c8",
"method": "POST", 302
"url": "https://mail.google.com/sync/u/0/i/fd?hl=en&c=1218&rt=r&pt=j", 304
"time_stamp": 1663915174648, 306
"request": {"subject": "xxx", "from": "eric@orby.ai", "to": "lukas@orby.ai"}, 308
}

FIG. 3B

Mapped to Action 320
{
"id": "e0daa604-369b-4c0b-8a25-b1897723dfc8",
"time_stamp": 1663915174648, 312
"activity": "SEND_EMAIL", 314
"payloads": [
{type: "email", "subject": "xxx", "from": "eric@orby.ai", "to": "lukas@orby.ai"},
], 316
"application": Gmail 318
}

FIG. 4

```
// Data model for emails.
// Supported applications: gmail, outlook
message Email {  410
    string id = 1;
    string from = 2;  402
    string to = 3;  404
    string subject = 4;  406
    string body = 5;  408
    repeated string attachment_ids = 6;
}

// Data model for excel sheets
// Supported applications: Google Sheets
message Sheets {  420
    message Sheet {  430
        message Cell {  440
            string value = 1  444;
        }
        string id = 1;
        string name = 2;
        map<string, Cell> cells = 3;
    }
    string id = 1;
    string name = 2;
    Folder folder = 3;
    repeated Sheet sheets = 4;
}
```

FIG. 6

602 Receive event data indicating one or more use events related to user interactions with one or more computer applications 604 Create action data of one or more actions from the event data based on a mapping between use events and actions, each action of the one or more actions having an identifier of an activity of a plurality of activities performed with a computer application, use data being operated on by the computer application via the activity, and a timestamp 606 Construct, for a specific activity of the plurality of activities, decision model based on the action data, the decision model including a rule specifying a first activity as a next activity or a probabilistic classifier that accepts use data being operated on via the specific activity and outputs an identifier of an activity to be performed as a next activity with a probability 608 Detect in real time, after constructing the decision model for the specific activity, performance of the specific activity with specific use data 610 When the decision model for the specific activity includes the rule, automatically apply the rule 612 When the decision model for the specific activity includes the probabilistic classifier and no applicable rule: executing the probabilistic classifier to obtain a list of candidate next activities an associated list of probabilities; and sending the list of candidate next activities, indicating a recommended next activity, and the associated list of probabilities to a device

PREDICTION AND AUTOMATIC PERFORMANCE OF COMPUTER-RELATED ACTIVITIES

BENEFIT CLAIM

This application claims the benefit under 35 U.S.C. § 120 as a continuation of U.S. patent application Ser. No. 17/992,689, filed on Nov. 22, 2022, now U.S. Pat. No. 11,704,174, issued on Jul. 18, 2023, the entire contents of which is hereby incorporated herein by reference for all purposes as if fully set forth herein. Applicant hereby rescinds any disclaimer of claim scope in the parent application or the prosecution history thereof and advise the USPTO that the claims in this application may be broader than any claim in the parent application.

TECHNICAL FIELD

The present application relates to automatic performance of sequences of computer-related activities, and, more particularly to, analyzing user interactions with computer applications and automatically executing computing applications on relevant data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer user may interact with computer applications extensively. Some of the user interactions may form repetitive sequences. For example, the user may routinely receive and read an email message that has an invoice attachment, download the invoice attachment, and import the invoice attachment to a personal accounting database. All the user interactions can be very time-consuming and error prone. It would be helpful to have a tool that can predict that a specific sequence of activities involving computer applications is to be performed and have the sequence of activities performed automatically.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 3A illustrates an example use event represented by a set of fields.

FIG. 3B illustrates an example action.

FIG. 4 illustrates an example business object model.

FIG. 6 illustrates an example process performed by a system for predicting and automatically performing activities related to computer applications in accordance with some embodiments described herein.

DESCRIPTION OF THE EXAMPLE EMBODIMENTS

Figure 1:
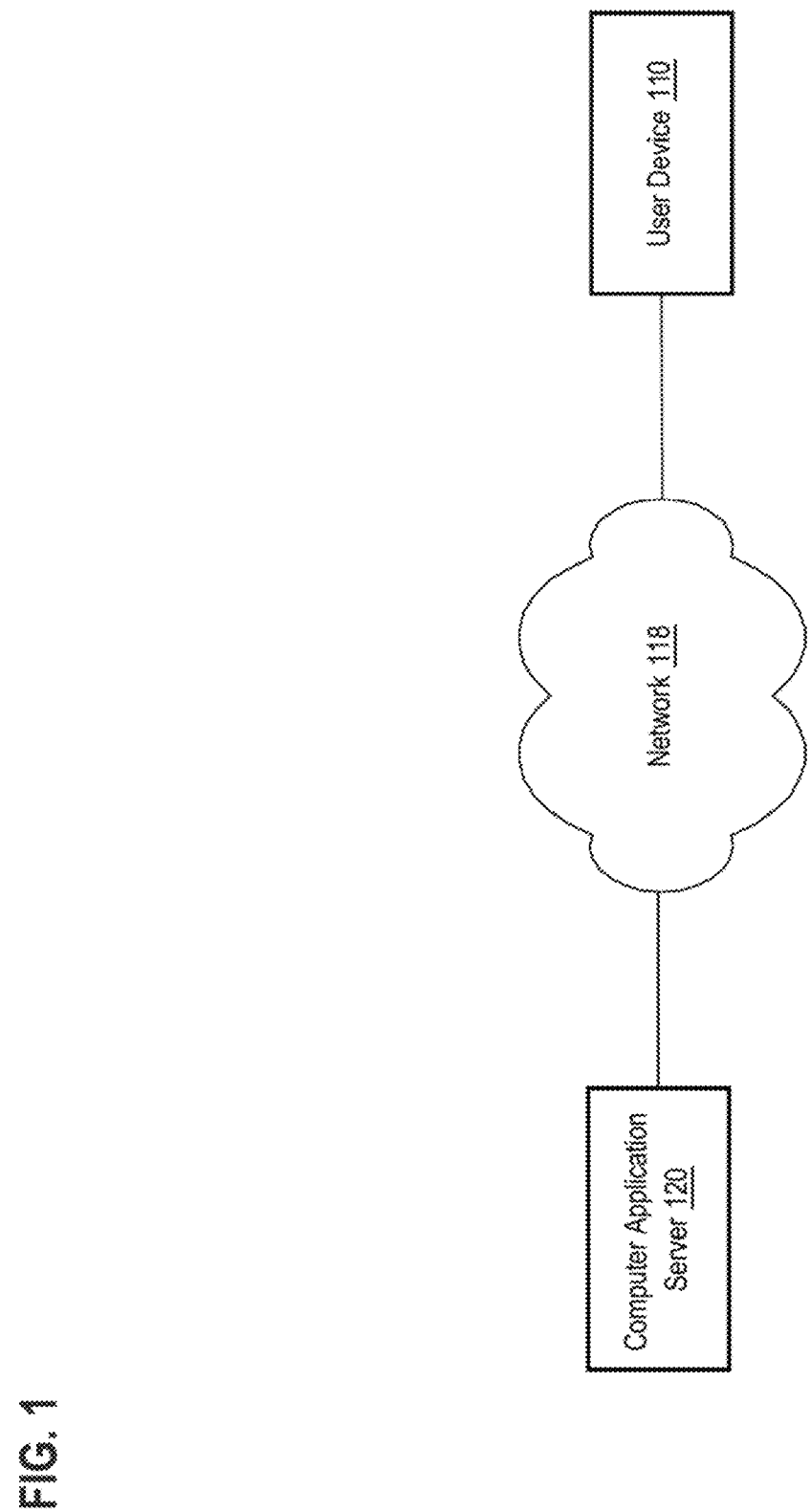
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

Embodiments are described in sections below according to the following outline:
1. GENERAL OVERVIEW
2. EXAMPLE COMPUTING ENVIRONMENTS
3. EXAMPLE COMPUTER COMPONENTS
4. FUNCTIONAL DESCRIPTIONS
   4.1. USE EVENT DETECTION AND ACTION CREATION
   4.2. ACTIVITY SEQUENCE IDENTIFICATION
   4.3. ACTIVITY RELATIONSHIP MODELING
   4.4. REAL-TIME PREDICTION OF NEXT ACTIVITY
   4.5. IMPROVEMENT OF MODELING BASED ON USER FEEDBACK
5. EXAMPLE PROCESSES
6. HARDWARE IMPLEMENTATION
7. EXTENSIONS AND ALTERNATIVES

1. General Overview

A system for predicting and automatically performing activities related to computer applications is disclosed. In some embodiments, the system is programmed to observe user interactions with computer applications and detect use events that represent computer-related activities that can be sequentially performed based on information regarding the previous activity in the sequence. The system is programmed to create, for each use event, an action that indicates an activity performed using a computer application, use data being operated on by the computer application, and a timestamp. The system is programmed to then build a decision model for each activity that predicts the next activity with a probability. Subsequently, the system is programmed to detect a current use event, create a current action indicating the current activity, apply the decision model for the current activity, create the next action based on the application result, and automatically effect the next use event.

In some embodiments, the system is programmed to detect use events from user interactions with computer applications. For example, as a user reads email using a Web client of an email program, a Hypertext Transfer Protocol (HTTP) "GET" message can be transmitted to the Web server of the email program and an email message can be received from the Web server in response. As the user then downloads an invoice attachment to an email message, a Document Object Model (DOM) event of a click of a "download" option associated with a thumbnail of the invoice attachment can be effected. The system, through a browser extension, can be programmed to detect the transmission of the HTTP message and response and the occurrence of the DOM event as two use events.

In some embodiments, for each use event, the system is programmed to create an action based on a mapping between use events and actions. Each action identifies a computer application and an activity performed with the computer application and has use data including an item being operated on by the computer application and a timestamp indicating when the activity is performed. The first use event can be mapped to an action that identifies the email program and the activity of reading email and has use data of an output item including the email message. The second use event can be mapped to an action that identifies the email program and the activity of downloading an attachment and has use data of an output item including the saved invoice attachment.

In some embodiments, the system is programmed to determine temporal relationships among activities from a set of actions and build a decision model for each activity as the current activity that can be used to decide on the steps to take regarding the next activity. When the current activity is typically followed by a certain activity, the system can be programmed to create a rule specifying the performance of the certain activity for the decision model. In other cases, the system can be programmed to train a probabilistic classifier for the decision model that accepts the use data of the current data and outputs a list of candidate next activities and the corresponding list of probabilities that the candidate next activities are expected to be performed. The system can be configured to initially build a decision tree to derive further rules for certain use data and subsequently build another probabilistic classifier for the decision model.

In some embodiments, the system is programmed to detect a new use event and create a new action specifying a new activity. The system is programmed to then execute the decision model for the new activity. When the decision model includes an applicable rule that specifies performance of a certain activity, the system is programmed to apply the rule and automatically perform the certain activity. Specifically, the system can be configured to create a certain action that specifies the current activity and has the appropriate use data. The system can then programmatically effect a certain event mapped from the certain action. For example, the new action may specify a new activity of reading email using the email program. The decision model for this new activity may include a rule that specifies performance of downloading an attachment. A certain action that specifies the email program and the certain activity of downloading the attachment can be created. A certain use event of effecting a DOM event of clicking on the "download" option associated with a thumbnail of an attachment of can then be automatically effected.

When the decision model does not include an applicable rule but a probabilistic classifier, the system is programmed to execute the probabilistic classifier and present the execution result including a recommendation for a next activity to prompt a user to confirm the recommendation or specify an alternative next activity. For example, the execution result may indicate that downloading an attachment is 70% likely to be the next activity and is thus the recommended next activity, while forwarding the email is 30% likely to be the next activity. In response, the system can be programmed to automatically perform the selected next activity. The system can be programmed to further update the decision model based on user feedback including user responses to notifications or recommendations or expected input.

The computer system has several technical benefits. By predicting and automatically performing the next activity, the system clearly reduces system response time without waiting for user interactions. The system also reduces errors in programmatically effecting a designated use event. By creating an effective mapping between use events and actions, the system needs to maintain only the current action for predicting and performing the next activity. By updating decision models based on user feedback, the system continuously improves the quality of the decision models.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a user device 110 and a computer application server 120, which are communicatively coupled through direct physical connections or via one or more networks 118.

In some embodiments, the user device 110 is associated with a user. The user device 110 can host and execute various computer applications, such as a Web browser, within which a Web client of another computer application can be running. The user device 110 can be configured to communicate with the computer application server 120 in automatically performing activities involving communications with remote computer applications. The user device 110 can be configured to offload at least some computation to a remote computer server (not shown), such as determining activity relationships based on a set of actions and creating a decision model for each activity. The user device 110 can comprise a desktop computer, laptop computer, tablet computer, smartphone, or wearable device.

In some embodiments, the computer application server 120 hosts and executes a computer application, which can be implemented as a Web server to receive and respond to requests from a corresponding Web client. The computer application server 120 can comprise any computing facility with sufficient computing power in data processing, data storage, and network communication to support the hosting and execution of the above-mentioned computer application.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the user device 110 is programmed to communicate with the computer application server 120 in performing activities using a computer application. The user device 110 can be configured to receive data from a server portion of the computer application hosted and executed by the computer application server 120. The user device 110 can be configured to also send data on behalf of a client portion of the computer program hosted and executed by the user device 110.

3. Example Computer Components

Figure 2:
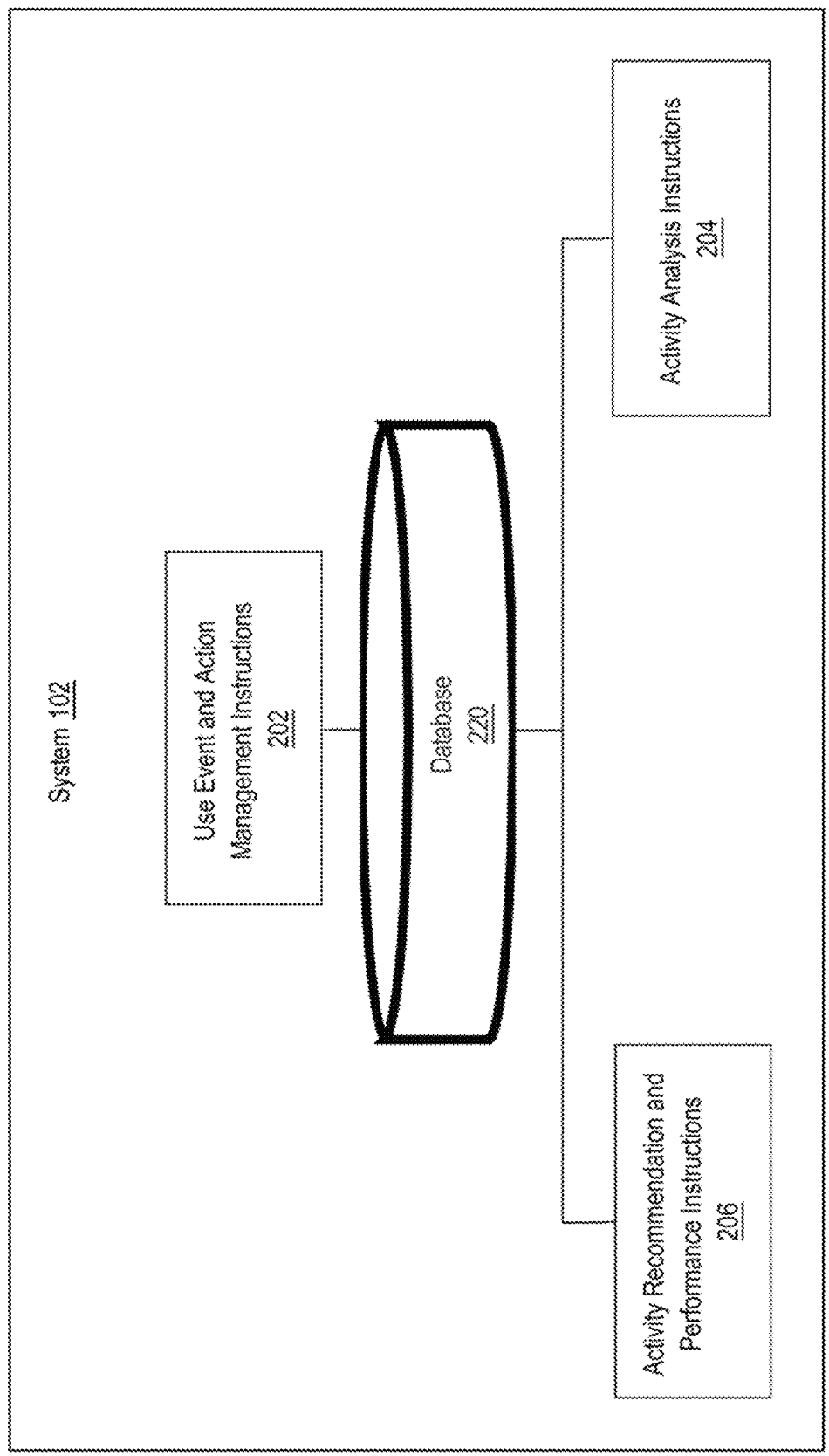
FIG. 2 illustrates example functional components of a system in accordance with the disclosed embodiments.

FIG. 2 illustrates example functional components of a system in accordance with the disclosed embodiments. The figure is for illustration purposes only and the system 102, which can be the user device 110 in FIG. 1, can comprise fewer or more functional or storage components. Each of the functional components can be implemented as software components, general or specific-purpose hardware components, firmware components, or any combination thereof. Each of the functional components can also be coupled with one or more storage components. A storage component can be implemented using any of relational databases, object databases, flat file systems, or JavaScript Object Notation (JSON) stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the system 102 comprises use event and action management instructions 202, activity analysis instructions 204, and activity recommendation and performance instructions 206. The system 102 also comprises a database 220.

In some embodiments, the use event and action management instructions 202 enable definition and detection of use events. The use events represent activities that can be performed using computer applications sequentially and automatically based on information regarding the current activity in the sequence. Occurrence of use events can be detected from user interactions with computer applications. The use event and action management instructions 202 also enable definition and creation of actions and a mapping between use events and actions. The action identifies a computer application and an activity performed using the computer application and also includes data of input items to or output items from the computer application and a timestamp of when the activity is performed. As a use event is detected, an action can be created based on the mapping. On other hand, as an action is created, a use event could be effected using the mapping. As a user continues to interact with the computer applications, use events could be detected, and actions could be created and predicted, and more use events could be automatically effected.

In some embodiments, the activity analysis instructions 204 enable modeling of activity relationships based on created actions. From the timestamps, temporal relationships among activities can be determined. The activity analysis instructions 204 also enable construction of decision models for the activities, where for each current activity, the nature of the temporal relationships with all candidate next activities can be evaluated or all use data being operated on via the current activity can be evaluated, to generate rules or probabilistic classifiers that govern the candidate next steps.

In some embodiments, the activity recommendation and performance instructions 206 enable predicting and automatically performing next activities. As new use events are detected, new actions can be created, and decision models can be used to identify candidate next activities, probabilities that the candidate next activities to be performed, and any candidate next activity that is to be automatically performed. The activity recommendation and performance instructions 206 also enable updating the decision models based on user feedback. User input received in response to a recommendation for a next activity or a performance of the next activity can be used to rebuild and improve the decision models.

In some embodiments, the database 220 is programmed or configured to manage storage of and access to relevant data, such as use events, actions, the mapping, the business object model, decision models, computer applications, logs, or audit trails.

4. Functional Descriptions

4.1. Use Event Detection and Action Creation

In some embodiments, the system 102 is programmed to detect "use events" caused by user interactions with computer applications. For example, the computer application can be an email program, and the user interaction may be reading an email message.

In some embodiments, the system 102 is implemented as a browser extension. Each computer application can have a Web client and a Web server. Various Web clients can be running within a Web browser to communicate with the corresponding Web servers. As a browser extension, the system 102 can access various browser data and monitor various browser events. For example, the system 102 can be implemented using JavaScript having access to the JavaScript application programming interface (API), which manages a list of JavaScript events for which listeners can be created. Such JavaScript events could be related to fetching data from a Web server, loading a webpage into the Web browser, resizing an element of a webpage, or submitting a form from the Web browser. Each JavaScript event provides a browser context within which a listener can operate.

In some embodiments, through integration with a Web browser, the system 102 can be programmed to detect use events involving Web-based computer applications from messages transmitted across a network under the HTTP or another Internet protocol for hypermedia communication over the Internet. Such use events are useful indicators of communications between a Web client of a computer application and a Web server of the computer application. In general, the system 102 can also be programmed to detect use events from data transmitted using other communication protocols in the application layer over computer networks, such as the Simple Mail Transfer Protocol (SMTP) or File Transfer Protocol (FTP). With appropriate configuration, the system 102 can also be programmed to detect use events from data transmitted using other communication protocols over computer networks, such as the Transmission Control Protocol (TCP) or User Datagram Protocol (UDP) in the transport layer, or data transmitted in accordance with any application programming interface (API) within operating systems instead of over networks.

FIG. 3A illustrates an example use event represented by a set of fields. An HTTP message for the use event of sending an email message using an email program can be parsed to identify a set of fields 310, including a method 302 and a universal resource locator (URL) 304, which two fields together indicate sending email using an email program, a timestamp 306, and a request 308, which includes the email message.

In some embodiments, through integration with a Web browser, the system 102 can be programmed to detect use events involving Web-based computer applications from user interface events triggered by interaction with browser objects using the DOM or another model for cross-platform representation of objects. For example, a DOM event can indicate a click on a "download" button of a webpage. Such use events are useful indicators of incidents within a Web client or communications between a Web client of a first computer application and a Web client of a second computer application. With appropriate configuration, the system 102 can also be programmed to detect use events from user interface events generated using other models for representation of user interface objects, such as the COMPONENT OBJECT MODEL (COM) or OBJECT LINKING AND EMBEDDING (OLE) technologies.

In some embodiments, the system 102 is programmed to detect use events with existing screen recording techniques. The system 102 is programmed to further identify user interface events from the recorded video using existing video analysis techniques. The identification can be based on predetermined user interface layouts and visual or audio changes of user interface objects. For example, it can be determined that a button at a certain position within the user interface is being selected as the edge of the button is highlighted or as a clicking sound is generated with a cursor over the button.

In some embodiments, the system 102 is programmed to create an action for a use event as the use event occurs based on a predetermined mapping between use events and actions. Each action specifies performing an activity using a computer application on one or more items as input or output data and contains activity metadata. In general, different computer applications lead to different activities even when the computer applications perform similar functions. For example, while for each of the GMAIL program and the HOTMAIL program, the possible operations include sending email and reading email, these operations can lead to four distinct activities. Each action also leads to a specific set of items. For example, reading email with GMAIL leads to an output item that corresponds to the email business object.

FIG. 3B illustrates an example action. From the use event represented by the set of fields 310, an action 320 can be created having an identifier of a computer application 318 mapped from the domain name in the URL 304, an identifier of an activity 314 mapped from the domain name in the URL 304 and the method 302, an item (payload) 316 mapped from the request 308, and a timestamp 312 mapped from the timestamp 306. In this example, the computer application is the GMAIL program, the activity is sending email, and the item includes an email message.

In some embodiments, the system 102 is programmed to further represent an item based on a predetermined business object model of business objects. Each item can be represented as an instance of a business object that has one or more attributes. Depending on the computer application, the system 102 can be programmed to identify the business object to use. For example, when the computer application is an email program, the business object can correspond to an email message; when the computer application is an invoicing program, the business object can correspond to a file, a spreadsheet, or a custom invoice.

FIG. 4 illustrates an example business object model. A first business object 410 corresponding to an email message has various string attributes, including a from attribute 402, a to attribute 404, a subject attribute 406, and a body attribute 408 all derived from the item 316. A second business object 420 corresponding to a spreadsheet book has hierarchical attributes, such as a spreadsheet attribute 430 having a cell attribute 440 having a string attribute 444.

In one example, a user may take the following series of steps using a Web browser:
(1) Reading an email message using an email program
(2) Downloading an invoice attachment to the local file system using the email program
(3) Importing the invoice using an invoicing program In some embodiments, while the series of steps may lead to many user interactions with computer applications, the system 102 is programmed to detect only predefined use events. Specifically, the system 102 is programmed to detect predefined use events that can be performed automatically and sequentially. In the example, the series steps may lead to the following series of use events:
(1) With the email Web client within the Web browser, sending a HTTP "GET" message to and receiving a response including the email message from the email Web server to get and read an email message
(2) With the email Web client within the Web browser, effecting a DOM event of clicking on the "download" button on a thumbnail (shown next to the email message) representing the invoice attachment to save a copy of the invoice attachment to (a specific location of) the local file system
(3) With the invoicing Web client within the Web browser, effecting a DOM event of choosing a "download" menu option of the Web browser to see a list of downloaded files; effecting another DOM event of clicking on an icon (shown in the list of downloaded files) representing the copy of the invoice attachment to select the copy; effecting another DOM event of dragging the icon and dropping the icon into the invoicing Web client to load and open the invoice document
(4) With the invoicing Web client within the Web browser, effecting multiple DOM events of dragging the "amount" field and each of several other fields of a processed invoice document (with automatic text recognition by the invoicing program) and dropping it to the corresponding field of an invoice form to complete the invoice form
(5) With the invoicing Web client within the Web browser, sending a HTTP "POST" message including the invoice form to be imported to and receiving a response from an invoicing Web server In some embodiments, the system 102 is programmed to interpret multiple user interactions as one use event. For example, the use event (3) above covers the user choosing the "download" menu option, clicking on the icon representing the copy of the invoice attachment, and opening the copy in the invoicing program. Such an interpretation enables determining and performing the next activity based on only the current action. For example, the action corresponding to the use event (3) above of loading an invoice document can be performed based on only the action corresponding to the use event (2) above of saving the invoice document, specifically the identifier of the invoice document. Alternatively, the system 102 can be programmed to maintain the last few actions in addition to only the current action for determining and performing the next activity. In the example, the series of use events can be mapped to the following series of actions:
(1) An action where the computer application is the email program, an output item including the email message corresponds to an email business object, and the activity is reading email using the email program
(2) An action where the computer application is the email program, an output item including the copy of the invoice document corresponds to a file business object, and the activity is saving an attachment using the email program
(3) An action where the computer application is the invoicing program, an input item including the copy of the invoice document corresponds to a file business object, and the activity is loading an invoice document using the invoice program (4) An action where the computer application is the invoicing program, an input item corresponds to an invoice business object including the processed invoice document, an output item including the invoice form also corresponds to an invoice business object, and the activity is completing an invoice form using the invoice program based on a correspondence between the two items (5) An action where the computer application is the invoicing program, an input item including the invoice object corresponds to an invoice business object, and the activity is importing an invoice form using the invoice program 4.2. Activity Sequence Identification In some embodiments, the system 102 is programmed to identify relationships among various activities from a set of actions. The system 102 can be programmed to identify temporal relationships between two activities from the timestamps in the actions. For example, the set of actions can be provided as input to the alpha algorithm, and a set of relationships between the activities can be produced as output. The set of relationships can also be modified based on user instructions. The output can be represented as a petri net or simply an activity graph having nodes representing the activities and edges representing relationships between the activities. The alpha algorithm generally ignores relationships forming loops and produces only forwarding flows. Alternatively, the list of actions can be used to directly construct an initial graph, a depth first search can be executed on the initial graph to identify loops, and the graph can be split into multiple activity graphs to break up the loops.

Figure 5:
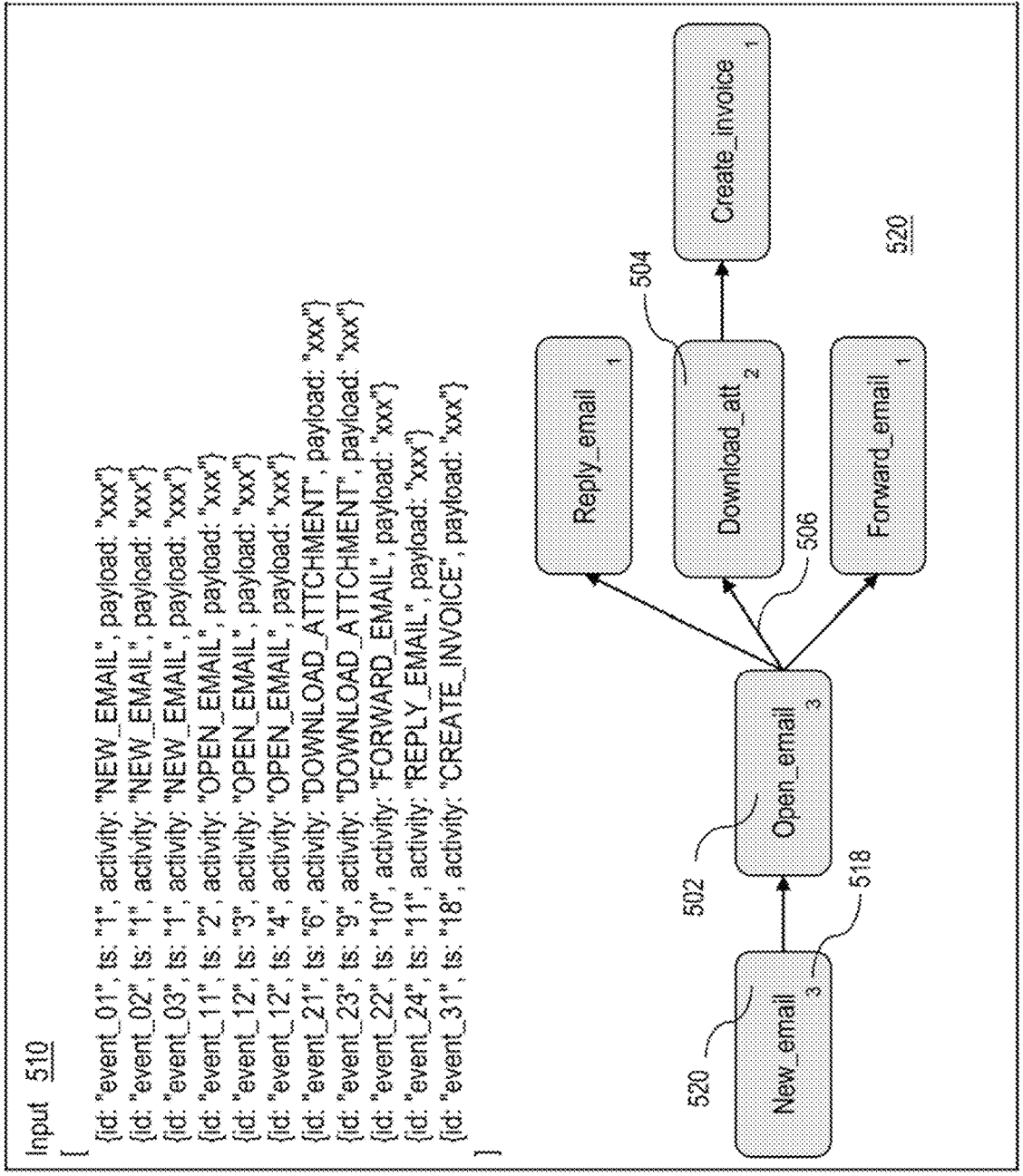
FIG. 5 illustrates an example process of creating an activity graph from a set of actions.

FIG. 5 illustrates an example process of creating an activity graph from a set of actions. In this example, the set of actions 510 can be processed to generate the activity graph 520. Each node in the activity graph 520 represents an activity, such as the node 502 representing opening email or the node 504 representing downloading an attachment. Each directed edge from a source node to a target node in the activity graph 520 represents a temporal relationship between activities, such as the edge 506 representing opening email occurring before downloading an attachment.

In some embodiments, the system 102 is programmed to also compute the number of times each activity is performed to assess how strong a relationship is between activities. In FIG. 5, the activity graph is enhanced with a count for each node. For example, the node 502 has a count of three, indicating that the activity represented by the node 502 is performed three times according to the set of actions. For a directed edge representing a relationship, the closer the count of the target node is to the count of the source node, the more likely that target activity represented by the target node is performed next to the source activity represented by the source node. Therefore, when the count of the target node exceeds a certain percentage of the count of the source node, once the source activity is performed, it can be expected with high confidence that the target activity is to be performed next.

4.3. Activity Relationship Modeling

In some embodiments, the system 102 is programmed to determine a decision model for identifying the next activity for each activity as the current activity. Instead of every activity in the activity graph, the system 102 can be configured to disregard those activities that satisfy certain criteria, such as those being represented as leaf nodes in the activity graph or having counts that do not exceed a threshold. When a first activity is excluded from this consideration, every activity represented as a node that can be reached from the node representing the first activity is also excluded.

In some embodiments, when a first activity is followed by a second activity more than a certain percentage of the time, the system 102 is programmed to include in the decision model for the first activity a rule that the second activity is the next activity to be performed.

In some embodiments, when a first activity is followed by a second activity no more than a certain percentage of the time, the system 102 is programmed to determine whether any rules can be derived for specific items in the actions using a probabilistic classification algorithm. Specifically, the system 102 can be programmed to prepare a training dataset of the group of items associated with the first activity from the set of actions, with feature vectors corresponding to attributes of the corresponding business objects and labels corresponding to the next activities. For example, in FIG. 5, the first activity can be opening email represented by the node 502. For each action in the set of actions 510 where the activity is opening email, different features corresponding to attributes of an email business object can be computed, and the label indicating the next activity of replying email, downloading an attachment, or forwarding email can be identified. The system 102 can be programmed to then build a decision tree from the training dataset and determine whether any path is associated with a probability that exceeds a threshold. When such a path exists that leads to a certain activity, the system 102 can be programmed to include in the decision model for the first activity a rule that when the item includes the attribute values along the path, the certain activity is the next activity to be performed. For the other attribute values, the system 102 can be programmed to include the decision tree in the decision model for the first activity, or build another probabilistic classifier and include that in the decision model for the first activity. Examples of other probabilistic classifiers include a naïve Bayes classifier, logistic regression model, or multilayer perceptron.

In some embodiments, the system 102 is programmed to build a different probabilistic classifier when the decision tree does not include any path associated with a probability that exceeds a threshold, or as the only probabilistic classifier in place of a decision tree. The system 102 is programmed to then include the probabilistic classifier in the decision model for the first activity.

4.4. Real-Time Prediction of Next Activity

In some embodiments, the system 102 is programmed to detect use events continuously and in real time. As each a use event is being detected, the system 102 is configured to create a corresponding action which identifies a current activity related to a computer application and an item being operated on by the computer application, as discussed above.

In some embodiments, the system 102 is configured to then determine whether there is any applicable rule in the decision model for the current activity. When there is an applicable rule, the system 102 is configured to apply the rule or send an alert to applying the applicable rule. As a rule generally specifies a next activity, the system 102 can be programmed to automatically perform the next activity. Specifically, the system 102 is programmed to start creating the next action given the next activity, including an identifier of the corresponding computer application, the activity, any input item, and a placeholder for each output item. Generally, when an item is an input item, it is obtained from the current action, while when an item is an output item, it is to be generated. The system 102 is then programmed to automatically perform the use event using the next action. For example, instead of being triggered by a user interaction with a "submit" button, the system 102 can be configured to directly send an HTTP message or pragmatically generate a click event on the "submit" button. Furthermore, instead of automatically performing the next activity, the system 102 can also be programmed to send a request to a user device for performing the next activity together with an explanation that the next activity is typically performed after the current activity. In response to receiving an approval from the user device, the system 102 is programmed to then perform the next activity.

In some embodiments, when there is no applicable rule, the system 102 is configured to execute a probabilistic classifier in the decision model to identify one or more next activities with one or more corresponding probabilities. The system 102 can be further configured to automatically perform a next activity when the corresponding probability exceeds a threshold. The system 102 can also send to a user device information regarding the one or more candidate next activities and the one or more corresponding probabilities and a request to specify the next activity. The information can include a recommendation for performing the candidate next activity with the higher probability. In response to receiving specification from the user device, the system 102 is programmed to then perform the next activity.

In one example, from new user interactions, the use event (1) discussed in Section 4.1 is detected, namely with the email Web client within the Web browser, sending a HTTP "GET" message to and receiving a response including the email message from the email Web server to get and read an email message. An action similar to the action (1) discussed in Section 4.1 is created, where the computer application is the email program, the output item including the email message corresponds to an email business object, and the activity is reading email using the email program. The decision model is then looked up for this activity. The decision model may contain only a rule indicating that the next activity is downloading an attachment. In this case, the next activity does not depend on the item from the current action, namely the email message. The rule is then simply applied.

As a result of applying the rule, the use event (2) discussed in Section 4.1 is automatically executed, namely with the email Web client within the Web browser, programmatically effecting a DOM event of clicking on the "download" button on a thumbnail representing the invoice attachment and next to a representation of the email message to save a copy of the invoice attachment to (a specific location of) the local file system. A notification of performing this use event could be transmitted to a user device or display device.

This use event (2) could similarly be detected, and an action similar to the action (2) discussed in Section 4.1 is created, where the computer application is the email program, the output item including the copy of the invoice document corresponds to a file business object, and the activity is saving an attachment using the email program. The decision model is then looked up for this activity. The decision model may contain only a probabilistic classifier. In this case, the next activity would depend on the output item of the current action, namely the copy of the invoice document. The probabilistic classifier is then executed on the item, which as an instance of a file business object may include a header attribute indicating that the document is a spreadsheet. The probabilistic classifier may generate a result indicating a first next activity of opening the document with a document editing program in with a probability of 25%, a second next activity of opening the document with an invoicing program with a probability of 45%, and a third next activity of forwarding email with a probability of 30%. The result can then be sent to a user device or display device, with the second next action as the recommended next activity, and in turn a specification of the second next activity can be received.

In response to receiving the specification, the use event (3) discussed in Section 4.1 is automatically executed, namely with the invoicing Web client within the Web browser, programmatically effecting a DOM event of choosing a "download" menu option of the Web browser to see a list of downloaded files, another DOM event of clicking on an icon (shown in the list of downloaded files) representing the copy of the invoice attachment to select the copy, and another DOM event of dragging the icon and dropping it into the invoicing Web client. The process could then continue in a similar fashion as discussed above.

Subsequently, an action similar to the action (4) discussed in Section 4.1 may be established, including an identifier of the invoicing program, the input item being the process invoice document, the output item being an instance of the invoice business object, and the activity of completing an invoice form using the invoice program based on a correspondence between the two items. The use event (4) is then automatically executed, namely with the invoicing client within the Web browser, programmatically effecting a DOM event of dragging the "amount" field and each of several other fields of a processed invoice document, and dropping it to the corresponding field of an invoice form to complete the invoice form.

4.5. Improvement of Modeling Based on User Feedback

In some embodiments, the system 102 is programmed to enhance the set of actions used to produce decision models with user replies to recommendations. When the user responds by selecting the recommended next activity, the system 102 can be programmed to give more weight to the corresponding sequence of the current activity and the recommended next activity. For example, instead of adding merely the two corresponding actions to the set of actions, the two corresponding actions could be duplicated by a first factor and the duplicated actions could also be added to the list of actions. The first factor could be larger for a larger current count of the current activity.

In some embodiments, when the user responds by selecting a non-recommended next activity, the system 102 can be programmed to give more weight to the corresponding sequence of the current activity and the selected next activity. For example, instead of adding merely the two corresponding actions to the set of actions, the two corresponding actions could be duplicated by a second factor and the duplicated actions could also be added to the list of actions. The second factor could be larger for a larger current count of the current activity but increase at a slower rate than the first factor. The system 102 can also be programmed to give less weight to the corresponding sequence of the current activity and the recommended next activity. For example, some existing corresponding actions could be removed from the set of actions.

In some embodiments, when the user unexpectedly responds after a rule is applied, the system 102 can be programmed to update the decision model for the previous activity. For example, after the previous activity of opening an invoice document within an invoicing program is performed, the current activity of completing an invoice form based on a correspondence between the processed invoice document and the invoice form within the invoicing program may be automatically performed based on a rule. When the user unexpectedly edits the invoice form instead of responding to the request regarding the next activity, the rule could be removed so that next time the same activity would not be performed, or a new activity can be created based on an updated correspondence and the decision model would include a probabilistic classifier to choose between the current activity and the new activity. Instead of updating an activity, the user could also instruct a reversal of the current activity, and similar remediation steps could be taken.

In some embodiments, the system 102 is programmed to re-regenerate the decision models periodically, upon user request, or in response to the size of the actions changing by a certain threshold. The system 102 can also be programmed to further update the decision models for different activities based on relationships among the decision models. For example, when multiple activities tend to be performed in sequence and thus when the decision models for the multiple activities comprise only rules specifying performance of the next activity in the sequence, the system 102 can be programmed to combine the multiple activities and the corresponding decision models. Such a combination can save time to evaluate decision models and reduce the amount of notification of applying rules.

5. Example Processes

FIG. 6 illustrates an example process performed by a system for predicting and automatically performing activities related to computer applications in accordance with some embodiments described herein. FIG. 6 is shown in simplified, schematic format for purposes of illustrating a clear example and other embodiments may include more, fewer, or different elements connected in various manners. FIG. 6 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In step 602, the system 102 is programmed or configured to receive event data indicating one or more use events related to user interactions with one or more computer applications.

In some embodiments, a use event of the one or more use events corresponds to one or more HTTP messages or DOM events, and a computer application of the one or more computer applications is a Web-based application.

In step 604, the system 102 is programmed or configured to create action data of one or more actions from the event data based on a mapping between use events and actions. Each action of the one or more actions has an identifier of an activity of a plurality of activities performed with a computer application, use data being operated on by the computer application via the activity, and a timestamp.

In some embodiments, the use data includes an input item being inputted to the computer application or an output item being outputted from the computer application, and the input item or the output item is an instance of a business object of a plurality of business objects.

In step 606, the system 102 is programmed or configured to construct, for a specific activity of the plurality of activities, a decision model based on the action data. The decision model includes a rule specifying a first activity as a next activity or a probabilistic classifier that accepts use data being operated on via the specific activity and outputs an identifier of an activity to be performed as a next activity with a probability.

In some embodiments, the system 102 is programmed to determine, from the action data, that a frequency at which the first activity is performed next to the specific activity exceeds a threshold. The system 102 is programmed to then create the rule in response to the determining. In other embodiments, the system 102 is programmed to determine, from the action data, that no frequency at which an activity is performed next to the specific activity exceeds a threshold. The system 102 is programmed to then train the probabilistic classifier based on the use data being operated on via activities performed next to the specific activity in the action data in response to the determining.

In some embodiments, the specific activity is related to transforming a first item being a first instance of a specific business object to a second item being a second instance of the specific business object.

In step 608, the system 102 is programmed or configured to detect in real time, after constructing the decision model for the specific activity, performance of the specific activity with specific use data.

In some embodiments, the system is programmed to detect a current use event from interaction data under an application layer protocol. The system is programmed to then create a current action for the current use event.

In step 610, when the decision model for the specific activity includes the rule, the system 102 is programmed or configured to automatically apply the rule.

In some embodiments, the system 102 is programmed to create a first action corresponding to the first activity based on the specific activity and the specific use data, determine a first use event from the first action based on the mapping, and pragmatically effect the first use event.

In step 612, when the decision model for the specific activity includes the probabilistic classifier and no applicable rule, the system 102 is programmed or configured to execute the probabilistic classifier to obtain a list of candidate next activities an associated list of probabilities, and send the list of candidate next activities, indicating a recommended next activity, and the associated list of probabilities to a device.

In some embodiments, the system 102 is further programmed to receive a specification of a certain next activity of the list of candidate next activities, and automatically perform the certain next activity. When the certain next activity is identical to the recommended next activity, the system 102 is programmed to update the probabilistic classifier to produce the recommended next activity with a higher probability. When the certain next activity is different from the recommended next activity, the system is programmed to update the probabilistic classifier to produce the recommended next activity with a lower probability or the certain next activity with a higher probability.

In some embodiments, the system 102 is programmed to receive a request to reverse application of the rule, and remove or update the rule in response to the request.

6. Hardware Implementation

According to one embodiment, the techniques described herein are implemented by at least one computing device.

The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
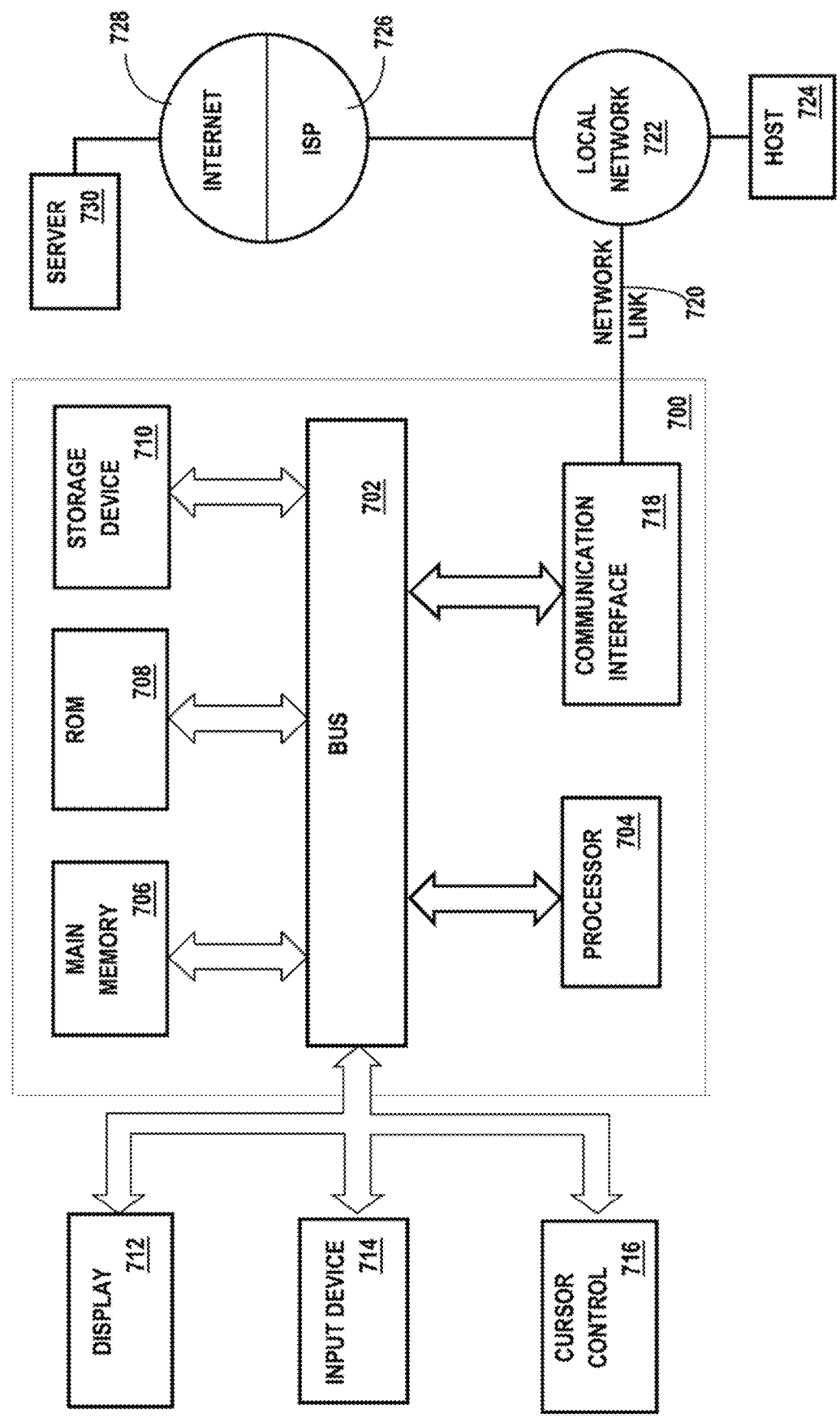
FIG. 7 is a block diagram that illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk, or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), HTTP or other communication protocols; file processing instructions to interpret and render files coded using Hypertext Markup Language (HTML), Extensible Markup Language (XML), Joint Photographic Experts Group (JPEG), Moving Picture Experts Group (MPEG) or Portable Network Graphics (PNG); user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on the output device 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infrared data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to I/O subsystem 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a LAN, WAN, campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, application programming interface (API) calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed:

1. A computer-implemented method of predicting and automatically performing activities related to computer applications, comprising:
   constructing, for a specific activity of a plurality of activities, a decision model based on action data of one or more actions,
   each action of the one or more actions having an identifier of an activity of the plurality of activities performed with a computer application, use data being operated on by the computer application via the activity, and a timestamp,
   the decision model including a rule specifying a first activity as a next activity or a probabilistic classifier that accepts use data being operated on via the specific activity and outputs an identifier of an activity to be performed as a next activity with a probability;
   detecting, in real time, performance of the specific activity with specific use data;
   when the decision model for the specific activity includes the rule, automatically applying the rule; and
   when the decision model for the specific activity includes the probabilistic classifier and no applicable rule:
   executing the probabilistic classifier to obtain a list of candidate next activities and an associated list of probabilities; and
   sending the list of candidate next activities, indicating a recommended next activity, and the associated list of probabilities to a device,
   wherein one or more steps is performed using a computer.

2. The computer-implemented method of claim 1, further comprising:
   receiving event data indicating one or more use events related to user interactions with one or more computer applications;
   creating the action data from the event data based on a mapping between use events and actions.

3. The computer-implemented method of claim 2,
a use event corresponding to one or more HTTP messages,
the mapping being based on a domain name, a payload, and a timestamp of an HTTP message of the one or more HTTP messages.

4. The computer-implemented method of claim 1,
the use data of the action including an item being inputted to the computer application or outputted from the computer application,
the item being an instance of a business object of a plurality of business objects under a business model that specifies a set of attributes for the business object.

5. The computer-implemented method of claim 4, the constructing comprising:
preparing, from the action data, a training dataset of feature vectors and labels,
each feature vector corresponding to a certain item associated with a certain action that identifies a certain activity and having features corresponding to attributes of the business object of which the certain item is an instance,
each label corresponding to a next activity performed next to the certain activity.

6. The computer-implemented method of claim 5, the constructing further comprising:
building a decision tree from the training dataset;
determining whether any path in the decision tree is associated with a probability that exceeds a threshold;
when a particular path is associated with a particular probability that exceeds the threshold, creating the rule specifying that when a particular item includes attribute values along the particular path, performing a particular activity that corresponds to a destination of the particular path.

7. The computer-implemented method of claim 2, the detecting comprising:
detecting a current use event from interaction data under an application layer protocol;
creating a current action for the current use event.

8. The computer-implemented method of claim 7, the automatically applying the rule comprising:
creating a first action, including an identifier of a first computer application to perform the first activity, an input item being inputted into the first computer application based on the specific activity, and a placeholder for each output item being outputted from the first computer application;
determining a first use event from the first action based on the mapping;
pragmatically effecting the first use event.

9. The computer-implemented method of claim 1, further comprising, when a candidate next activity is associated with a probability that exceeds a threshold, automatically performing the candidate next activity.

10. The computer-implemented method of claim 1, further comprising:
receiving a specification of a certain next activity of the list of candidate next activities from the device;
automatically performing the certain next activity.

11. A computer-readable, non-transitory storage medium storing computer-executable instructions, which when executed cause one or more processors to perform a method of predicting and automatically performing activities related to computer applications, the method comprising:
constructing, for a specific activity of a plurality of activities, a decision model based on action data of one or more actions,
each action of the one or more actions having an identifier of an activity of the plurality of activities performed with a computer application, use data being operated on by the computer application via the activity, and a timestamp,
the decision model including a rule specifying a first activity as a next activity or a probabilistic classifier that accepts use data being operated on via the specific activity and outputs an identifier of an activity to be performed as a next activity with a probability;
detecting, in real time, performance of the specific activity with specific use data;
when the decision model for the specific activity includes the rule, automatically applying the rule; and
when the decision model for the specific activity includes the probabilistic classifier and no applicable rule:
executing the probabilistic classifier to obtain a list of candidate next activities and an associated list of probabilities; and
sending the list of candidate next activities, indicating a recommended next activity, and the associated list of probabilities to a device.

12. The computer-readable, non-transitory storage medium of claim 11, the method further comprising:
receiving event data indicating one or more use events related to user interactions with one or more computer applications;
creating the action data from the event data based on a mapping between use events and actions.

13. The computer-readable, non-transitory storage medium of claim 12,
a use event corresponding to one or more HTTP messages,
the mapping being based on a domain name, a payload, and a timestamp of an HTTP message of the one or more HTTP messages.

14. The computer-readable, non-transitory storage medium of claim 11,
the use data of the action including an item being inputted to the computer application or outputted from the computer application,
the item being an instance of a business object of a plurality of business objects under a business model that specifies a set of attributes for the business object.

15. The computer-readable, non-transitory storage medium of claim 14, the constructing comprising:
preparing, from the action data, a training dataset of feature vectors and labels,
each feature vector corresponding to a certain item associated with a certain action that identifies a certain activity and having features corresponding to attributes of the business object of which the certain item is an instance,
each label corresponding to a next activity performed next to the certain activity.

16. The computer-readable, non-transitory storage medium of claim 15, the constructing further comprising:
building a decision tree from the training dataset;
determining whether any path in the decision tree is associated with a probability that exceeds a threshold;
when a particular path is associated with a particular probability that exceeds the threshold, creating the rule specifying that when a particular item includes attribute values along the particular path, performing a particular activity that corresponds to a destination of the particular path.

17. The computer-readable, non-transitory storage medium of claim 12, the detecting comprising:
   detecting a current use event from interaction data under an application layer protocol;
   creating a current action for the current use event.

18. The computer-readable, non-transitory storage medium of claim 17, the automatically applying the rule comprising:
   creating a first action, including an identifier of a first computer application to perform the first activity, an input item being inputted into the first computer application based on the specific activity, and a placeholder for each output item being outputted from the first computer application;
   determining a first use event from the first action based on the mapping;
   pragmatically effecting the first use event.

19. The computer-readable, non-transitory storage medium of claim 11, the method further comprising, when a candidate next activity is associated with a probability that exceeds a threshold, automatically performing the candidate next activity.

20. The computer-readable, non-transitory storage medium of claim 11, the method further comprising:
   receiving a specification of a certain next activity of the list of candidate next activities from the device;
   automatically performing the certain next activity.

* * * * *